(12) United States Patent
Tsuruya (10) Patent No.: US 7,426,119 B2
(45) Date of Patent: *Sep. 16, 2008

(54) SWITCHING POWER SUPPLY APPARATUS (75) Inventor: Mamoru Tsuruya, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/465,298

(22) Filed: Aug. 17, 2006

(65) Prior Publication Data

US 2007/0047273 A1 Mar. 1, 2007

(30) Foreign Application Priority Data

Aug. 25, 2005 (JP) ............................. 2005-244061

(51) Int. Cl.
H02M 3/335 (2006.01)
(52) U.S. Cl. ...................................................... 363/16
(58) Field of Classification Search ................ 363/16, 363/17, 97, 98, 131, 132, 19, 91; 323/355, 323/361
See application file for complete search history.

(56) References Cited

U.S. PATENT DOCUMENTS

| 4,389,581 | A | * | 6/1983 | Iwasaki ........................ 307/419 |
| 4,499,530 | A | * | 2/1985 | Onda et al. .................... 363/17 |
| 4,626,976 | A | * | 12/1986 | Abe et al. ...................... 363/19 |
| 5,088,017 | A | * | 2/1992 | Yaginuma et al. ......... 363/21.04 |
| 5,124,906 | A | * | 6/1992 | Kang ......................... 363/21.1 |
| 5,377,090 | A | * | 12/1994 | Steigerwald .................. 363/20 |
| 5,450,307 | A | * | 9/1995 | Yasumura ..................... 363/47 |
| 5,640,310 | A | * | 6/1997 | Yasumura ..................... 363/19 |
| 6,324,081 | B1 | * | 11/2001 | Sakamoto et al. ............. 363/25 |
| 6,956,748 | B2 | * | 10/2005 | Nakagawa .................... 363/16 |
| 2001/0019490 | A1 | * | 9/2001 | Igarashi et al. ................ 363/19 |
| 2003/0002301 | A1 | * | 1/2003 | Yamagishi et al. ........ 363/21.12 |
| 2003/0117818 | A1 | * | 6/2003 | Ota ............................. 363/47 |
| 2004/0004848 | A1 | * | 1/2004 | Yuzurihara et al. ........... 363/16 |
| 2004/0037099 | A1 | * | 2/2004 | Nishikawa ................... 363/125 |
| 2005/0001680 | A1 | * | 1/2005 | Ratzel ......................... 330/165 |
| 2005/0068796 | A1 | * | 3/2005 | Morita ........................ 363/120 |
| 2005/0226015 | A1 | * | 10/2005 | Tsuruya ...................... 363/89 |
| 2006/0165220 | A1 | * | 7/2006 | Takahashi et al. ........... 378/109 |
| 2006/0192774 | A1 | * | 8/2006 | Yasumura ................... 345/211 |

FOREIGN PATENT DOCUMENTS

JP 2002-112465 4/2002

* cited by examiner

Primary Examiner—Adolf Berhane
Assistant Examiner—M'Baye Diao
(74) Attorney, Agent, or Firm—Oblon, Spivak, McClelland, Maier & Neustadt, P.C.

(57) ABSTRACT

A switching power supply apparatus comprising: a first transformer, one end of a primary winding thereof being connected to one end of a secondary winding of a converter transformer; a second transformer, one end of a primary winding thereof being connected to another end of the secondary winding of the converter transformer; a reactor connected to both ends of a series circuit having the secondary windings; a smoothing capacitor, one end thereof being connected to the primary windings of transformers; a first diode connected to a connection between the first winding and a second winding of the first transformer and the other end of the smoothing capacitor; and a second diode connected to a connection between a first winding and a second winding of the second transformer and the other end of the smoothing capacitor.

8 Claims, 8 Drawing Sheets

SWITCHING POWER SUPPLY APPARATUS

BACKGROUND OF THE INVENTION

The present invention relates to a switching power supply apparatus including a step-down DC/DC converter, and more particularly, to a miniaturization technique.

Figure 1:
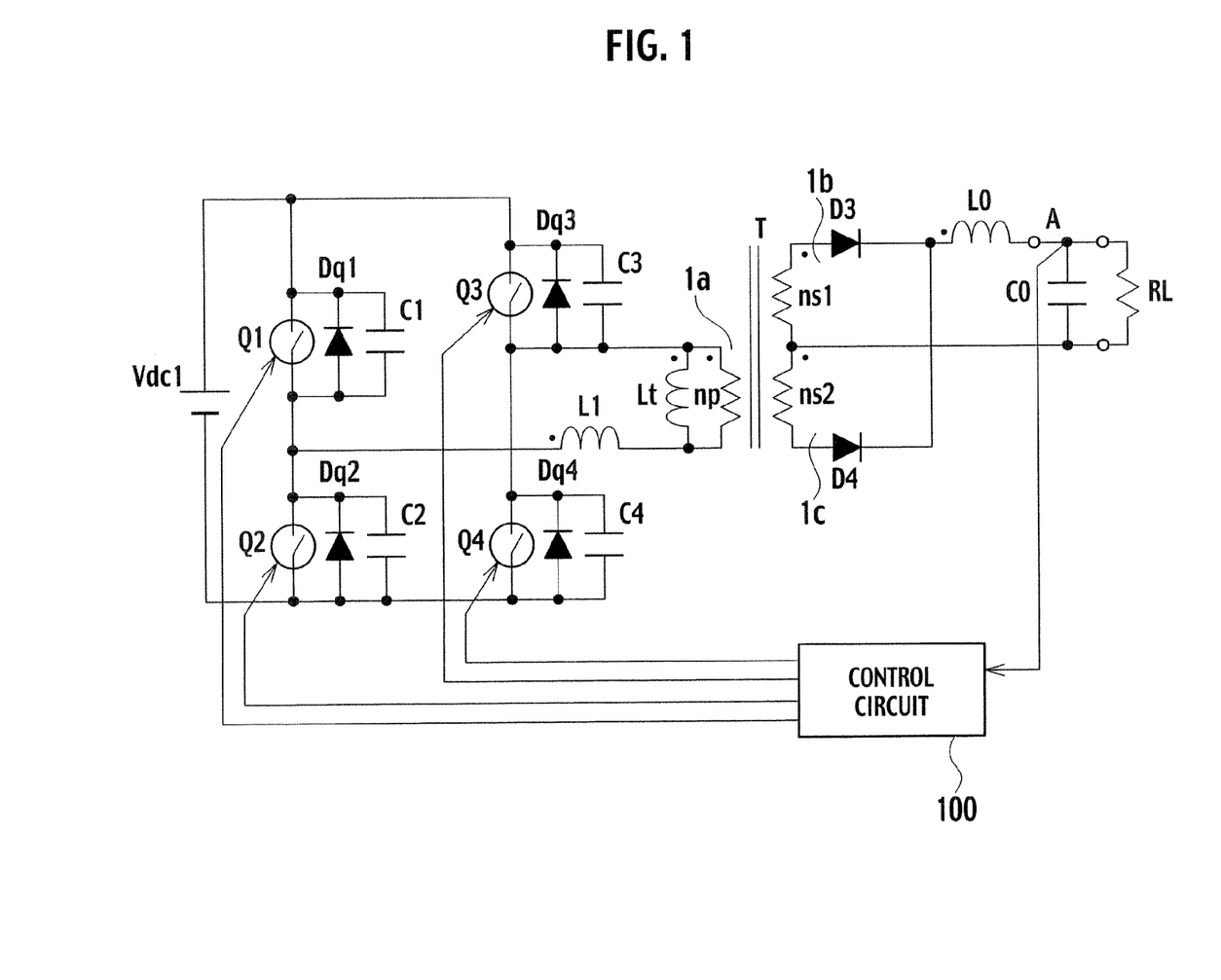
FIG. 1 is a circuit diagram of a conventional switching power supply apparatus.

As a large electricity insulative DC/DC converter with low output voltage and high output current, there is used a forward bridge converter. FIG. 1 shows a circuit diagram of a conventional switching power supply apparatus of this kind.

In FIG. 1, a series circuit having a switching Q1 including a MOSFET or the like and a switch Q2 including a MOSFET or the like is connected to both ends of a DC power supply Vdc1, and a series circuit having a switch Q3 including a MOSFET or the like and a switch Q4 including a MOSFET or the like is connected to both ends of the DC power supply Vdc1.

A series circuit having a primary winding 1a (winding number of np, exciting inductance of Lt) of a transformer T and a reactor L1 is connected between a connection of the switch Q1 and the switch Q2, and a connection of the switch Q3 and the switch Q4.

A diode Dq1 and a capacitor C1 are connected to both ends of the switch Q1 in parallel, a diode Dq2 and a capacitor C2 are connected to both ends of the switch Q2 in parallel, a diode Dq3 and a capacitor C3 are connected to both ends of the switch Q3 in parallel, and a diode Dq4 and a capacitor C4 are connected to both ends of the switch Q4 in parallel.

A primary winding 1a of the transformer T, a first secondary winding 1b (winding number of ns1), and a second secondary winding 1c (winding number of ns2) are wound in phase. The first secondary winding 1b and the second secondary winding 1c are serially connected to each other on the secondary side of the transformer T, an anode of a diode D3 is connected to one end (filled circle side) of the first secondary winding 1b, and an anode of a diode D4 is connected to one end of the second secondary winding 1c. A series circuit having a reactor Lo and a smoothing capacitor Co is connected between a connection of a cathode of the diode D3 and a cathode of the diode D4 and a connection of the first secondary winding 1b and the second secondary winding 1c. The diodes D3 and D4, the reactor Lo, and the smoothing capacitor Co constitute a rectifying smoothing circuit. The rectifying smoothing circuit rectifies and smoothens voltage (ON/OFF controlled pulse voltage) induced by the first secondary winding 1b and the second secondary winding 1c of the transformer T, and outputs the resultant voltage to a load RL.

A control circuit 100 ON/OFF controls the pair of the switch Q1 and the switch Q4 and the pair of the switch Q2 and the switch Q3 alternately at a predetermined cycle, and when an output voltage of the rectifying smoothing circuit becomes equal to or higher than a reference voltage, the control circuit 100 narrows an ON pulse width (ON period) to be applied to gates of the switches of each pair, and widens an OFF pulse width (OFF period) to be applied to gates of the switches of each pair. That is, when the output voltage of the rectifying smoothing circuit becomes equal to or higher than the reference voltage, the on-duties of the switches of each pair are narrowed, thereby controlling the output voltage to maintain a constant voltage.

An operation of the conventional switching power supply apparatus shown in FIG. 1 thus configured will be explained with reference to a timing chart shown in FIG. 2.

Figure 2:
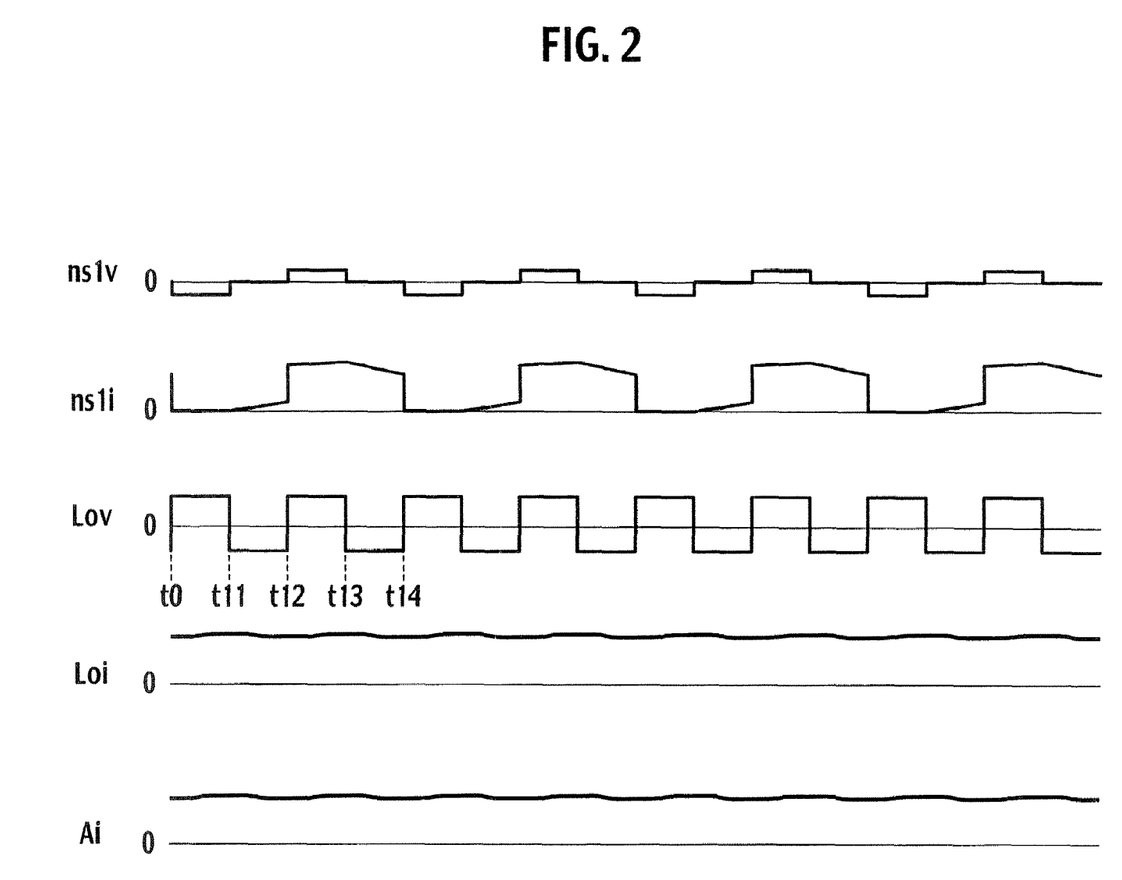
FIG. 2 is a timing chart of signals of portions of the conventional switching power supply apparatus.

In FIG. 2, a reference symbol "ns1v" represents voltages of both ends of the first secondary winding 1b of the transformer T, "ns1i" represents current flowing to the first secondary winding 1b of the transformer T, "Lov" represents voltages of both ends of the reactor Lo, "Loi" represents current flowing to the reactor Lo, and "Ai" represents current flowing through a point A.

At time t0, if the switches Q2 and Q3 are turned OFF and the switches Q1 and Q4 are turned ON, current passes through a path extending along Vdc1, Q1, L1, 1a, Q4, and Vdc1. Since negative voltage is generated in one end of the first secondary winding 1b and the other end (on the side of the black circle) of the second secondary winding 1c, current ns1i does not flow through the diode D3 and the first secondary winding 1b, and the current flows through the diode D4. That is, current Loi flows through a path extending along 1c, D4, Lo, Co, and 1c. Thus, positive voltage is generated in one end (on the filled circle side) of the reactor Lo.

At time t11, if the switches Q1 and Q4 are turned OFF, voltage ns1v of the first secondary winding 1b and voltage ns2v (not shown) of the second secondary winding 1c become substantially zero, and current ns1i is also substantially zero. At that time, current Loi flows through a path extending along Lo, Co, 1c, D4, and Lo. At that time, voltage in one end of the reactor Lo becomes negative voltage.

At time t12, if the switches Q1 and Q4 are turned OFF and the switches Q2 and Q3 are turned ON, current flows through a path extending along Vdc1, Q3, 1a, L1, Q2, and Vdc1. Since positive voltage is generated in one end of the first secondary winding 1b and the other end of the second secondary winding 1c, current ns1i flows through the diode D3 and the first secondary winding 1b, and no current flows through the diode D4. That is, current Loi flows through a path extending along 1b, D3, Lo, Co, and 1b. Thus, positive voltage is generated in the reactor Lo.

At time t13, if the switches Q2 and Q3 are turned OFF, voltage ns1v of the first secondary winding 1b and voltage ns2v (not shown) of the second secondary winding 1c become substantially zero, and current ns1i is gradually reduced. At that time, current Loi flows through a path extending along Lo, Co, 1b, D3, and Lo. At that time voltage in one end of the reactor Lo is negative voltage.

An operation from time t14 and thereafter is the repetition of operations from time t0 to time t13.

SUMMARY OF THE INVENTION

In a conventional switching power supply apparatus, however, when the power is high, voltage per one turn of a transformer is high. Since the winding number of the transformer is one turn at least, if the on-duty of the switching device is lowered, voltage lower than the voltage per one turn of the transformer is outputted.

In this case, since a peak value of current of the switching device is increased, it is necessary to use a large switching device and thus, the efficiency lowers. Therefore, for a switching power supply apparatus of low voltage and high power, power supply apparatuses with small capacity are connected in parallel in many cases, thereby making the apparatus expensive.

According to the present invention, it is possible to provide a small switching power supply apparatus that can reduce loss of the switching device.

According to a first technical aspect of the present invention, there is provided a switching power supply apparatus having a conversion circuit that turns ON/OFF DC voltage of a DC power supply to supply the DC voltage to a primary winding of a converter transformer and outputs voltage which is symmetric in terms of positive and negative from a secondary winding of the converter transformer, including: a first smoothing transformer whose one end of a secondary winding is connected to one end of a secondary winding of the converter transformer and which includes a primary winding having a first winding and a second winding and a secondary winding; a second smoothing transformer whose one end of a secondary winding is connected to another end of the secondary winding of the converter transformer, and which includes a primary winding having a first winding and a second winding and a secondary winding; a reactor connected to both ends of a series circuit to which the secondary winding of the first smoothing transformer and the secondary winding of the second smoothing transformer are serially connected; a smoothing capacitor whose one end is connected to the other end of the primary winding of the first smoothing transformer and the other end of the primary winding of the second smoothing transformer; a first diode connected to a connection between the first winding and the second winding of the first smoothing transformer, and to the other end of the smoothing capacitor; and a second diode connected to a connection between the first winding and the second winding of the second smoothing transformer, and to the other end of the smoothing capacitor.

According to a second technical aspect of the invention, there is provided a switching power supply apparatus having a conversion circuit that turns ON/OFF DC voltage of a DC power supply to supply the DC voltage to a primary winding of a converter transformer and outputs voltage which is symmetric in terms of positive and negative from a secondary winding of the converter transformer, including: a first smoothing transformer whose one end of a primary winding is connected to one end of a secondary winding of the converter transformer and which has a primary winding including a first winding and a second winding and a secondary winding; a second smoothing transformer whose one end of a primary winding is connected to another end of the secondary winding of the converter transformer, and which has a primary winding having a first winding and a second winding and a secondary winding; a reactor connected to both ends of a series circuit to which the secondary winding of the first smoothing transformer and the secondary winding of the second smoothing transformer are serially connected; a smoothing capacitor whose one end is connected to the other end of the primary winding of the first smoothing transformer and the other end of the primary winding of the second smoothing transformer; a first switching device connected to a connection between the first winding and the second winding of the first smoothing transformer, and to the other end of the smoothing capacitor; and a second switching device connected to a connection between the first winding and the second winding of the second smoothing transformer, and to the other end of the smoothing capacitor, the second switching device being turned ON/OFF complementarily with respect to the first switching device.

A third technical aspect of the invention provides the switching power supply apparatus according to the first or the second technical aspect, wherein in each of the smoothing transformers, if a winding number of the first winding is defined as np1 and a winding number of the second winding is defined as np2, a winding number ratio A determined by A=(np1+np2)/np2 is adjusted.

A fourth technical aspect of the invention provides the switching power supply apparatus according to any of the above technical aspects, wherein the switching power supply further includes a core formed with a closed magnetic circuit and having first to third legs, the primary winding of the first smoothing transformer is wound around the first leg of the core, the primary winding of the second smoothing transformer is wound around the second leg of the core, and a gap is formed in the third leg of the core.

A fifth technical aspect of the invention provides the switching power supply apparatus according to any one of the first to the third technical aspects, including a core formed with a closed magnetic circuit and having a plurality of legs, in which a first coil including the primary winding of the first smoothing transformer and a second coil including the primary winding of the second smoothing transformer are wound around one of the legs of the core, and a magnetic shunt is provided between the first and the second coils.

BRIEF DESCRIPTION OF THE DRAWINGS

FIGS. 8A to 8E show magnetic circuits including a transformer and a reactor of a DC/DC converter of the present invention, in which

DESCRIPTION OF THE PREFERRED EMBODIMENTS

Embodiments of a switching power supply apparatus according to the present invention will be explained in detail with reference to the accompanying drawings.

The switching power supply apparatus according to the embodiment includes an insulative converter of low voltage and power current and includes two smoothing transformers. The outputs of the transformers are synthesized by the smoothing transformers, and the outputs are added to a reactor connected to a secondary winding of the respective smoothing transformers, thereby storing energy. A primary winding of the smoothing transformer is provided with a tap, and the smoothing transformer is operated as an autotransformer. With this configuration, the secondary winding of a converter transformer serves as one winding for one output, and the winding number can be easily adjusted. Thus, even when the secondary voltage of the converter transformer is high, by adjusting the tap position of the smoothing transformer, on-duty of the switching device (switch) can be optimized and loss is reduced.

According to the present invention, an effective value of current of the secondary winding of the converter transformer is reduced, and the converter transformer can be miniaturized. By devising a magnetic circuit, the transformer and the reactor are integrally formed, and a circuit is further miniaturized.

First Embodiment

Figure 3:
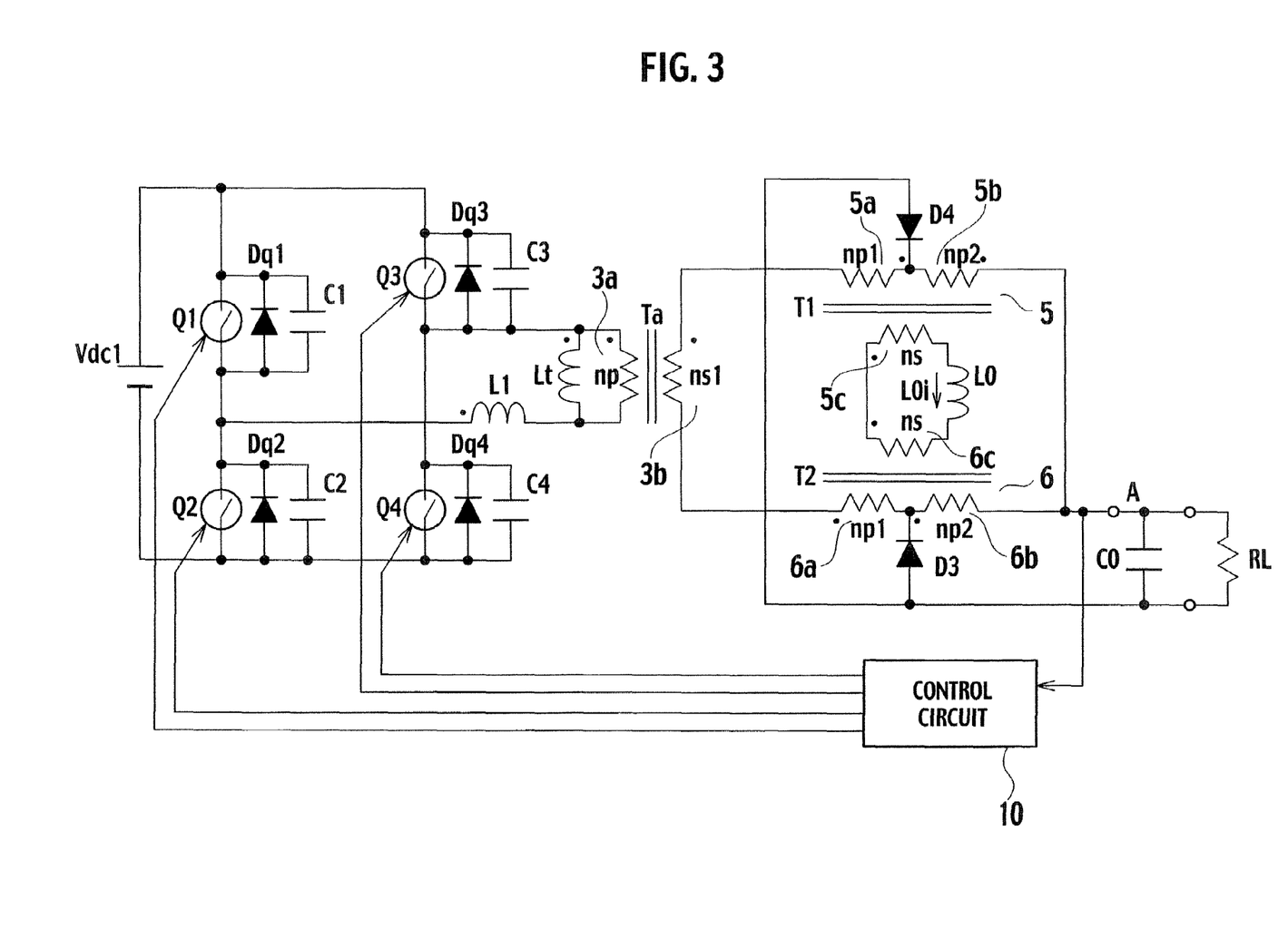
FIG. 3 is a circuit diagram of a switching power supply apparatus according to a first embodiment.

FIG. 3 is a circuit diagram of a switching power supply apparatus according to a first embodiment. The switching power supply apparatus shown in FIG. 3 is a converter that steps down voltage of a DC power supply. A series circuit having a switch Q1 including an MOSFET or the like and a switch Q2 including an MOSFET or the like is connected to both ends of a DC power supply Vdc1. A series circuit having a switch Q3 including an MOSFET or the like and a switch Q4 including an MOSFET or the like is connected to both ends of the DC power supply Vdc1.

A series circuit having a primary winding 3a (winding number of np, exciting inductance of Lt) of a transformer Ta (converter transformer) and a reactor L1 is connected between a connection of the switches Q1 and Q2 and a connection of the switches Q3 and Q4. That is, the switches Q1 to Q4 constitute a full-bridge.

A diode Dq1 and a capacitor C1 are connected to both ends of the switch Q1 in parallel, and a diode Dq2 and a capacitor C2 are connected to both ends of the switch Q2 in parallel. A diode Dq3 and a capacitor C3 are connected to both ends of the switch Q3 in parallel, and a diode Dq4 and a capacitor C4 are connected to both ends of the switch Q4 in parallel.

A control circuit 10 alternately turns ON/OFF the switch Q1 and the switch Q2, and also alternately turns ON/OFF the switch Q3 and the switch Q4, generates a phase difference between the switch Q1 and the switch Q3 (or the switch Q2 and the switch Q4), and controls a period during which voltage is applied to the primary winding 3a of the transformer Ta. Thus, when output voltage to the load RL becomes equal to or higher than a reference voltage, the phase difference is reduced, thereby controlling the output voltage to maintain constant voltage.

The switches Q1 to Q4 constitute a conversion circuit. The conversion circuit turns ON/OFF (intermittently) DC voltage of the DC power supply Vdc1 to supply the voltage to the primary winding 3a (winding number of np) of the transformer Ta, and outputs voltage (AC voltage) which is symmetric in terms of positive and negative from the secondary winding 3b (winding number of ns1) of the transformer Ta.

One end of a first winding 5a of a transformer T1 (first smoothing transformer) is connected to one end of the secondary winding 3b of the transformer Ta, and the transformer Ti includes a primary winding 5 and a secondary winding 5c having a first winding 5a (winding number of np1) and a second winding 5b (winding number of np2). One end of a first winding 6a of a transformer T2 (second smoothing transformer) is connected to the other end of the secondary winding 3b of the transformer Ta, and the transformer T2 includes a primary winding 6 and a secondary winding 6c having a first winding 6a (winding number of np1) and a second winding 6b (winding number of np2).

The reactor Lo is connected to both ends of a series circuit to which the secondary winding 5c of the transformer T1 and the secondary winding 6c of the transformer T2 are serially connected. One end of the smoothing capacitor Co is connected to the other end of the second winding 5b of the transformer T1 and the other end of the second winding 6b of the transformer T2.

The other end of the first winding 5a of the transformer T1 and the one end of the second winding 5b are connected to each other, and a diode D4 (first diode) is connected to a connection thereof and the other end of the smoothing capacitor Co. The other end of the first winding 6a of the transformer T2 and the one end of the second winding 6b are connected to each other, and a diode D3 (second diode) is connected to a connection thereof and the other end of the smoothing capacitor Co. A DC output is supplied to the load RL from the smoothing capacitor Co.

An operation of thus configured switching power supply apparatus according to the first embodiment will be explained with reference to a timing chart shown in FIG. 4.

Figure 4:
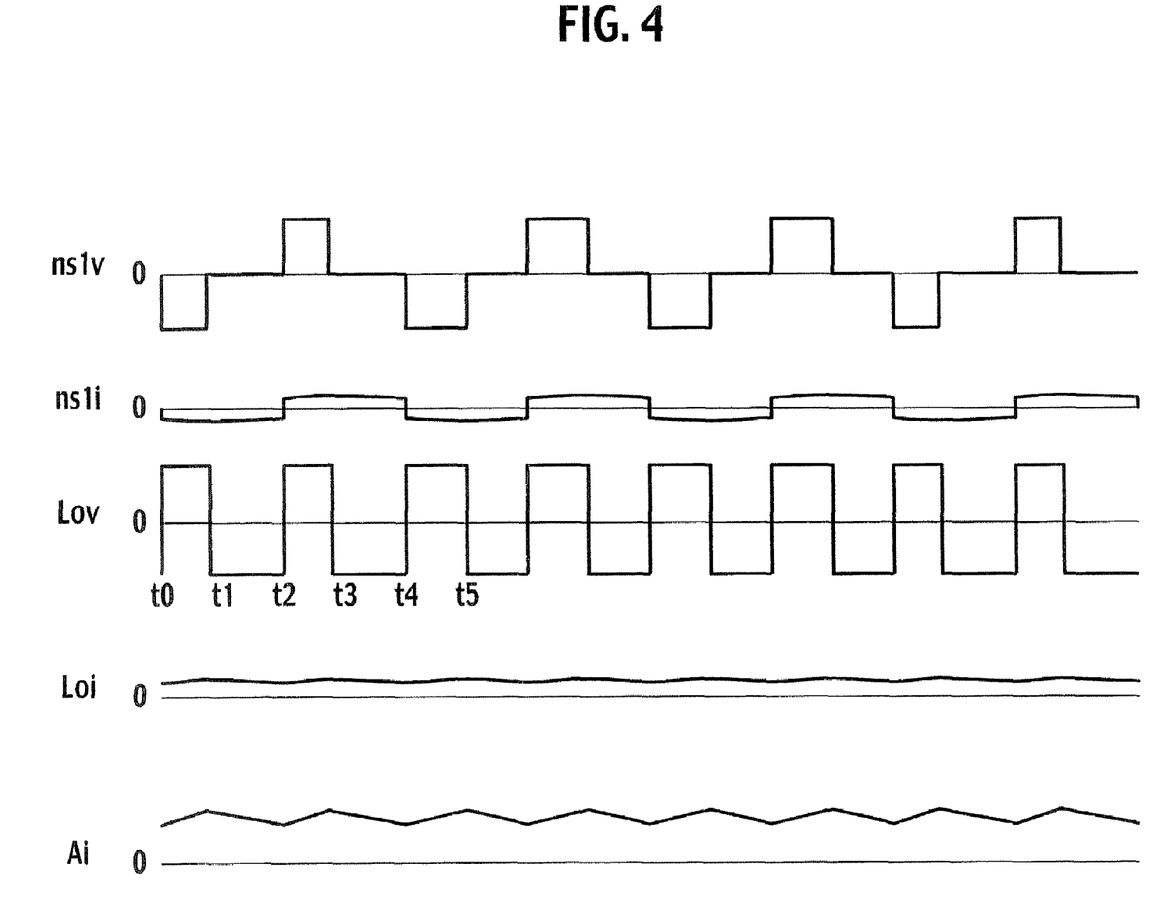
FIG. 4 is a timing chart of signals of various portions of the switching power supply apparatus according to the first embodiment.

In FIG. 4, a reference symbol "ns1$v$" represents voltage of both ends of the secondary winding 3b of the transformer Ta, "s1$i$" represents current flowing through the secondary winding 3b of the transformer Ta, "Lov" represents voltage of both ends of the reactor Lo, a "Loi" represents current flowing through the reactor Lo, and "Ai" represents current flowing through a point A.

The switch Q1 and the switch Q2 are alternately turned ON and OFF, the switch Q3 and the switch Q4 are also alternately turned ON and OFF. When the ON/OFF phases of the switch Q1 and the switch Q3 are the same, voltage is not generated in the secondary winding 3b of the transformer Ta, and when there is a phase difference in ON/OFF of the switch Q1 and the switch Q3, voltage is generated only in time region when the phase difference is generated. In the same manner, when the ON/OFF phases of the switch Q2 and the switch Q4 are the same, voltage is not generated in the secondary winding 3b of the transformer Ta, and when there is a phase difference in ON/OFF of the switch Q2 and the switch Q4, voltage is generated only in time region when the phase difference is generated. Therefore, a rectangular wave voltage ns1$v$ which is symmetric in terms of positive and negative as shown in FIG. 4 appears at the secondary winding 3b of the transformer Ta.

At time t2, if the switch Q3 is in an ON state and the switch Q2 is turned ON, a phase difference is generated in ON/OFF of the switch Q1 and the switch Q3, and current flows in a clockwise direction through a path extending along Vdc1, Q3, 3a, L1, Q2, and Vdc1. As a result, voltage of the one end (in the filled circle side) of the secondary winding 3b of the transformer Ta becomes positive, and current flows in a clockwise direction through a path extending along 3b, 5a, 5b, Co, D3, 6a, and 3b. At the same time, voltage is induced in the secondary winding 5c of the transformer T1, and current flows in a clockwise direction through a path extending along 5c, Lo, 6c, and 5c. At that time, voltage Lov of the reactor Lo is positive.

The current Loi flows by law of equal ampere-turns of the transformer or the like, and energy is stored in the reactor Lo, and when the winding number (np1+np2=np) of the primary winding 5 and the winding number ns of the secondary winding 5c of the transformer T1 are the same, the current Loi is the same as that flowing through the primary winding 5. That is, the same current flows through the secondary winding 6c of the transformer T2. Therefore, current that is (ns/np2) times higher than the current Loi flows through the second winding 6b of the primary winding 6 of the transformer T2.

Similarly, current which is (np1/np2) times higher than the current Loi flows through the second winding 6b of the transformer T2 by the current flowing through the first winding 6a of the transformer T2. Therefore, current which is (ns/np2)+(np1/np2) times higher than the current Loi, that is, current being {(np+np1)/np2} times higher than the current Loi flows through the second winding 6b of the transformer T2.

Current flowing through the transformer T1 is added to the current flowing through the second winding 6b of the transformer T2 in the smoothing capacitor Co. Therefore, current which is 1+{(np+np1)/np2} times higher flows through the smoothing capacitor Co. Therefore, by adjusting the tap positions of the primary winding 5 of the transformer T1 and the primary winding 6 of the transformer T2, it is possible to adjust the output current of the smoothing capacitor Co with respect to current of the secondary winding 3b of the transformer Ta. Since the input power and the output power are the same naturally, output voltage is a reciprocal of the current with respect to the magnification of the current.

At time t3, if the switch Q2 is in an ON state and the switch Q3 is turned OFF, the ON/OFF phases of the switch Q1 and the switch Q3 become the same, and the voltage ns1v of the secondary winding 3b of the transformer Ta becomes substantially zero. In this case, voltage Lov of the reactor Lo becomes negative, and current flows (leftward from 6a in the drawing) through a path extending along 5a, 5b, Co, D3, 6a, 3b, and 5a caused by energy stored in the reactor Lo. That is, Current of 2·np/np2 times the current Loi continuously flows through the smoothing capacitor Co. When the winding numbers np1 of the first windings 5a and 6a and the winding numbers np2 of the second windings 5b and 6b are the same, current of four times can be supplied to the load RL, and the output voltage is lowered by ¼ times with respect to the conventional art.

FIG. 4 shows a case where np1=np2, and the output and the scale are the same as those of the conventional art shown in FIG. 2. Voltage ns1v of the secondary winding 3b of the transformer Ta shown in FIG. 4 is four times higher than the voltage ns1v of the secondary winding 1b of the transformer T of the conventional art, and the current ns1i is ¼ times in the same manner.

At time t4, if the switch Q3 is in an OFF state and the switch Q2 is turned OFF, a difference is generated in ON/OFF phases of the switch Q1 and the switch Q3, and current flows through a path extending along Vdc1, Q1, L1, 3a, Q4, and Vdc1 (rightward from L1 in the drawing). That is, voltage of the other end of the secondary winding 3b of the transformer Ta becomes positive, and current flows through a path extending along 3b, 6a, 6b, Co, D4, 5a, and 3b (rightward from 6a and 6b in the drawing). At the same time, voltage is induced in the secondary winding 6c of the transformer T2, and current Loi flows in a clockwise direction through a path extending along 6c, 5c, Lo, and 6c. At that time, voltage Lov of the reactor Lo becomes positive.

The current Loi flows by law of equal ampere-turns of the transformer or the like, energy is stored in the reactor Lo, and when the winding number (np1+np2=np) of the primary winding 6 and the winding number ns of the secondary winding 6c of the transformer T2 are the same, the current becomes the same as that flowing through the primary winding 6. That is, the same current flows also through the secondary winding 5c of the transformer T1. Thus, current being (ns/np2) times higher than the current Loi flows through the second winding 5b of the primary winding 5 of the transformer T1.

In the similar manner, current being (np1/np2) times higher than the current Loi flows through the second winding 5b of the transformer T1 by current flowing through the first winding 5a of the transformer T1. Therefore, current being (ns/np2)+(np1/np2) times higher than the current Loi, that is, current being {(np+np1)/np2} times higher than the current Loi flows through the second winding 5b of the transformer T1.

Current flowing through the transformer T2 is added to current flowing through the second winding 5b of the transformer Ti in the smoothing capacitor Co. Therefore, current which is 1+{(np+np1)/np2} times higher than the current Loi flows through the smoothing capacitor Co. Therefore, by adjusting the tap positions of the primary winding 5 of the transformer T1 and the primary winding 6 of the transformer T2, it is possible to adjust the output current of the smoothing capacitor Co with respect to current of the secondary winding 3b of the transformer Ta.

At time t5, if the switch Q2 is in an OFF state and the switch Q3 is turned ON, the ON/OFF phases of the switch Q1 and the switch Q3 become the same, and the voltage ns1v of the secondary winding 3b of the transformer Ta becomes substantially zero. In this case, voltage Lov of the reactor Lo becomes negative, and current flows (rightward from 6a and 6b in the drawing) through a path extending along 6a, 6b, Co, D4, 5a, 3b, and 6a by energy stored in the reactor Lo. That is, current of 2·np/np2 times the current Loi continuously flows through the smoothing capacitor Co. When the winding numbers np1 of the first windings 5a and 6a and the winding numbers np2 of the second windings 5b and 6b are the same, current of four times can be supplied to the load RL, and the output voltage becomes ¼ times with respect to the conventional art.

FIG. 4 shows a case where np1=np2, and the output and the scale are the same as those of the conventional art shown in FIG. 2. Voltage ns1v of the secondary winding 3b of the transformer Ta shown in FIG. 4 is four times higher than the voltage ns1v of the secondary winding 1b of the transformer T shown in FIG. 2, and the current ns1i is ¼ times in the same manner.

An example shown in FIG. 2 has the first secondary winding 1b and the second secondary winding 1c, and of current flowing through these windings, only half-wave with which the diodes D3 and D4 are conductively flows. On the contrary, in an example shown in FIG. 4, positive and negative currents flow through the same secondary winding 3b. Therefore, when the loss of the secondary winding is the same, the amount of copper of the secondary winding 3b can be reduced to ½ in the first embodiment, and the secondary winding 3b can be miniaturized.

By adjusting the tap positions of the transformers T1 and T2 (connection between the first windings 5a and 6a and the second windings 5b and 6b), that is, the winding number ratio A=np/np2 (A≧1) of the transformers T1 and T2, the on-duty of the switching device can be optimized and the switching power supply apparatus can handle output voltage of low voltage.

According to the switching power supply apparatus according to the first embodiment, the two transformers T1 and T2 are provided, the outputs of the transformers are synthesized by the transformers T1 and T2 and are added to the reactor Lo connected to the secondary windings 5c and 6c of the transformers T1 and T2 to store energy (charge), the primary windings 5 and 6 of the transformers T1 and T2 are provided with taps to operate as an autotransformer, and the secondary winding 3b of the transformer Ta serves as one winding for one output. Thus, even when the secondary voltage of the transformer Ta is higher, the secondary winding 3b of the transformer Ta can be adjusted by adjusting the tap positions of the transformers T1 and T2.

Since the secondary winding 3b can be adjusted, the ON period of the switching device is increased (on-duty of the switching device is optimized) with respect to low voltage and high current, the peak value of current is reduced, and the loss of the switching device can be reduced.

An effective value of current flowing through the transformer Ta can be set to (21/2/N). Thus, the wire material of the secondary winding 3b can be reduced and the transformer Ta can be miniaturized. Here, the number N is a winding number ratio of the secondary windings with respect to the conventional transformer.

Second Embodiment

Figure 5:
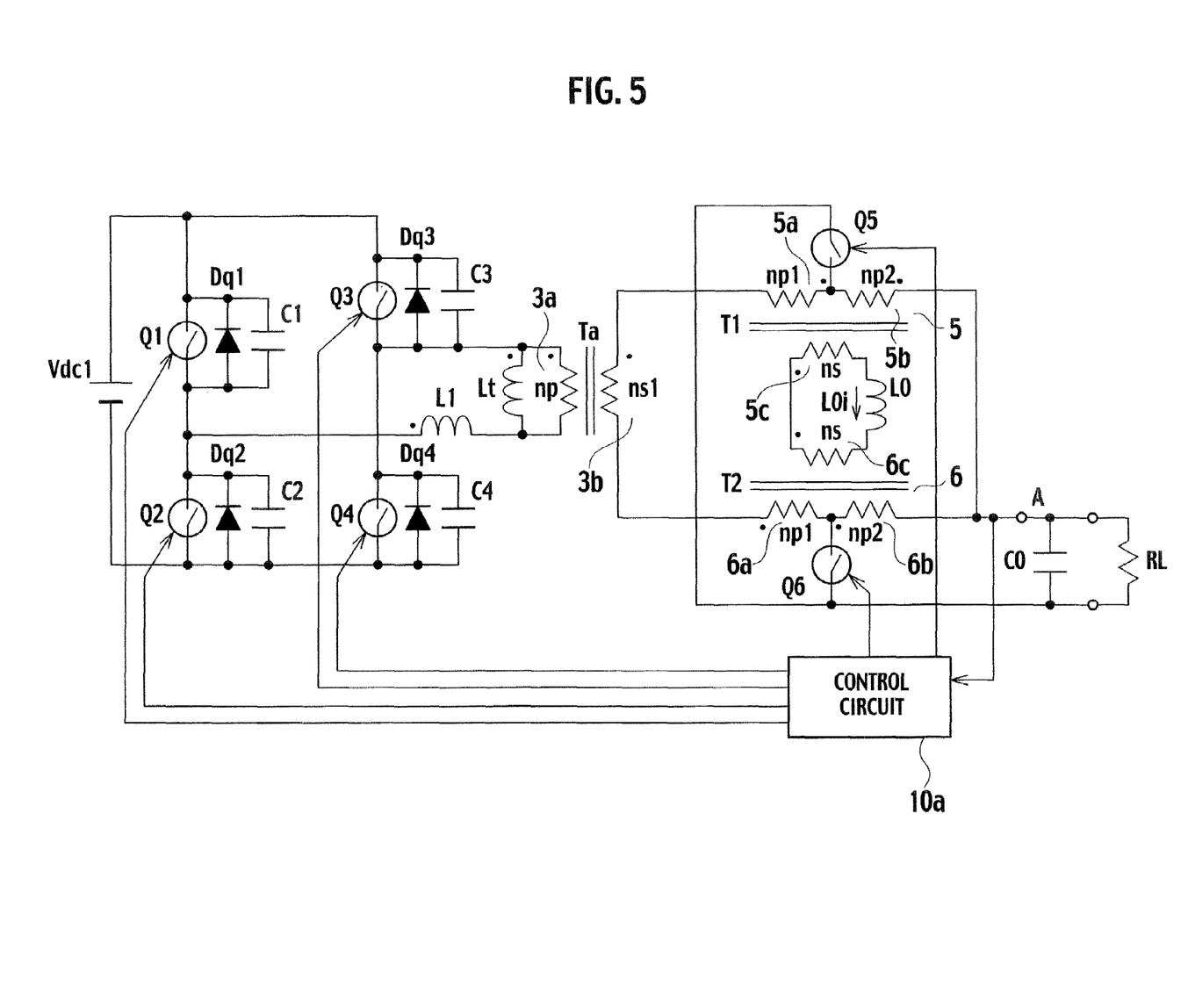
FIG. 5 is a circuit diagram of a switching power supply apparatus according to a second embodiment.

FIG. 5 is a circuit diagram of a switching power supply apparatus according to a second embodiment. As compared with the switching power supply apparatus shown in FIG. 3, the switching power supply apparatus shown in FIG. 5 has its feature in that the diode D4 is replaced by a switch Q5 (first switching element) including an MOSFET or the like, the diode D3 is replaced by a switch Q6 (second switching element) including an MOSFET or the like, the control circuit 10 is replaced by a control circuit 10a, and the control circuit 10a controls such as to turn ON/OFF the switch Q5 in synchronization with the switch Q1, and turn ON/OFF the switch Q6 in synchronization with the switch Q2.

Since an operation of the switching power supply apparatus according to the second embodiment is substantially the same as the operation shown in the timing chart in FIG. 4, details of the operation will be omitted here.

At time t0 to time t2, the switch Q6 is turned OFF and the switch Q5 is turned ON, and at time t2 to time t4, the switch Q5 is turned OFF and the switch Q6 is turned ON by the control circuit 10a, so that the switching power supply apparatus is operated similarly to that of the first embodiment shown in FIG. 3.

According to the switching power supply apparatus of the second embodiment, since the switches Q5 and Q6 including the MOSFETs that perform synchronous rectification are used, loss of a diode due to low voltage and high current can be reduced.

Third Embodiment

Figure 6:
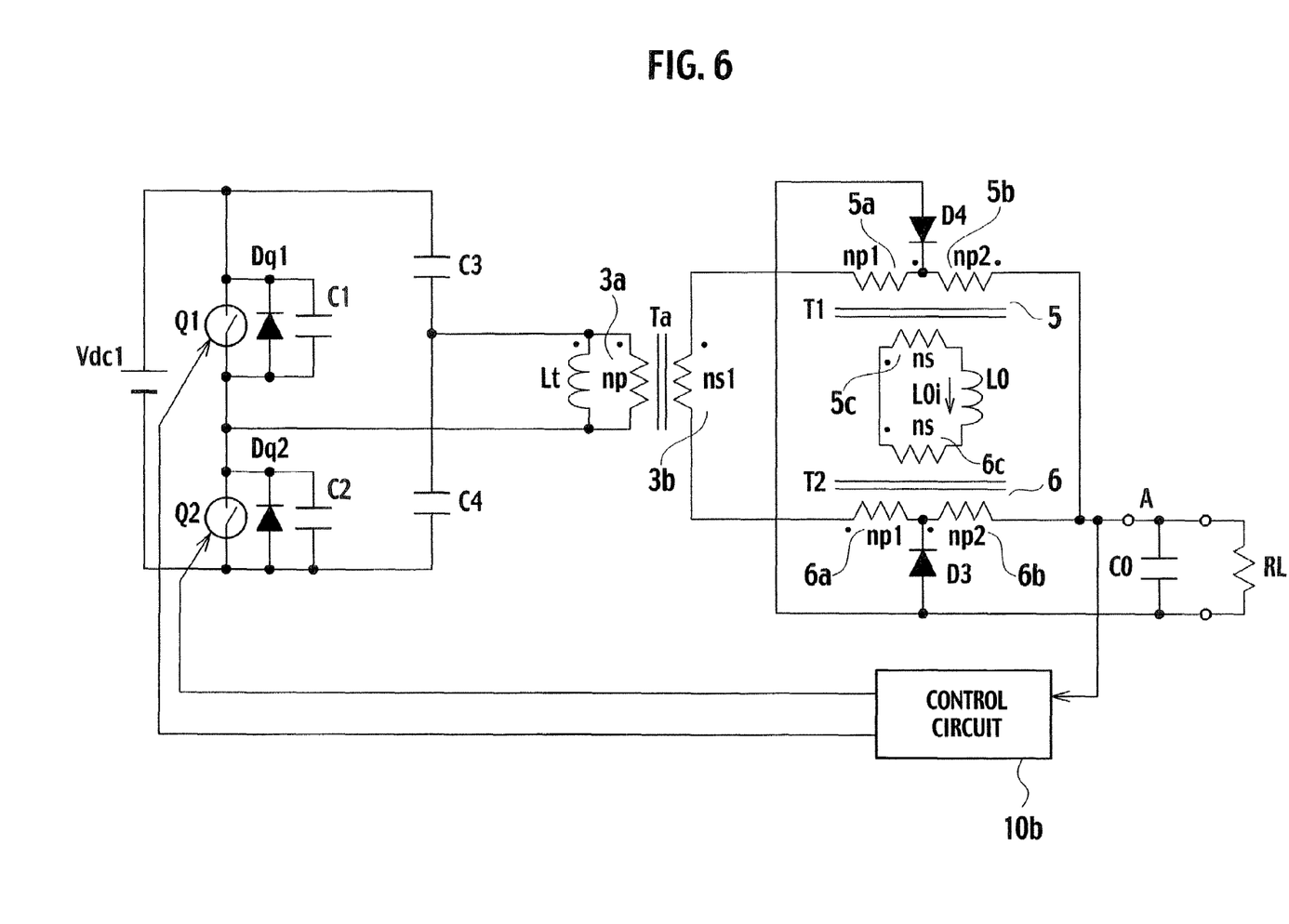
FIG. 6 is a circuit diagram of a switching power supply apparatus according to a third embodiment.

FIG. 6 is a circuit diagram of a switching power supply apparatus according to a third embodiment. While a full-bridge conversion circuit including the switches Q1 to Q4 is used in FIG. 3, the third embodiment has its feature in that a half-bridge conversion circuit including the switches Q1 and Q2 and capacitors C3 and C4 is used in FIG. 6.

According to the conversion circuit, DC voltage of the DC power supply Vdc1 is turned ON/OFF (intermittently), the DC voltage is supplied to the primary winding 3a (winding number of np) of the transformer Ta, and voltage (AC voltage) which is symmetric in terms of positive and negative is outputted from the secondary winding 3b (winding number of ns1) of the transformer Ta.

In FIG. 6, a series circuit having the switch Q1 including an MOSFET or the like and the switch Q2 including an MOSFET or the like is connected to both ends of the DC power supply Vdc1. A series circuit having the capacitor C3 and the capacitor C4 is connected to both ends of the DC power supply Vdc1. The primary winding 3a of the transformer Ta is connected between a connection of the switch Q1 and the switch Q2, and a connection of the capacitor C3 and the capacitor C4.

The diode Dq1 and the capacitor C1 are connected to both ends of the switch Q1 in parallel, and the diode Dq2 and the capacitor C2 are connected to both ends of the switch Q2 in parallel.

A control circuit 10b controls the switch Q1 and the switch Q2 such that they are alternately turned ON/OFF at a predetermined cycle in such a way that when output voltage to the load RL becomes equal to or higher than a reference voltage, ON pulse width to be applied to gates of the switches Q1 and Q2 is narrowed, and OFF pulse width to be applied to the gates of the switches Q1 and Q2 is widened. In other words, when the output voltage to the load RL becomes equal to or higher than the reference voltage, on-duty of each of the switches Q1 and Q2 is narrowed to control the output voltage to maintain a constant voltage.

According to the switching power supply apparatus of the third embodiment, the secondary circuit of the transformer Ta is the same as that of the configuration shown in FIG. 3, and only the conversion circuit on the primary side of the transformer Ta is different. Therefore, an operation of only the conversion circuit will be explained with reference to the timing chart shown in FIG. 4.

At time t2, if the switch Q1 is in an OFF state and the switch Q2 is turned ON, current flows in a clockwise direction through a path extending along Vdc1, C3, 3a, Q2, and Vdc1, and voltage is induced in the secondary winding 3b of the transformer Ta. At time t3, if the switch Q2 is turned OFF, voltage ns1v of the secondary winding 3b of the transformer Ta becomes substantially zero.

At time t4, if the switch Q2 is in an OFF state and the switch Q1 is turned ON, current flows through a path extending along Vdc1, Q1, 3a, C4, and Vdc1 (upward from Vdc1 in the drawing), and voltage is induced in the secondary winding 3b of the transformer Ta. And at time t5, if the switch Q1 is turned OFF, voltage ns1v of the secondary winding 3b of the transformer Ta becomes substantially zero.

According to the switching power supply apparatus of the third embodiment, the same effect as that of the switching power supply apparatus according to the first embodiment can be obtained, and the configuration of the conversion circuit is simple.

Fourth Embodiment

Figure 7:
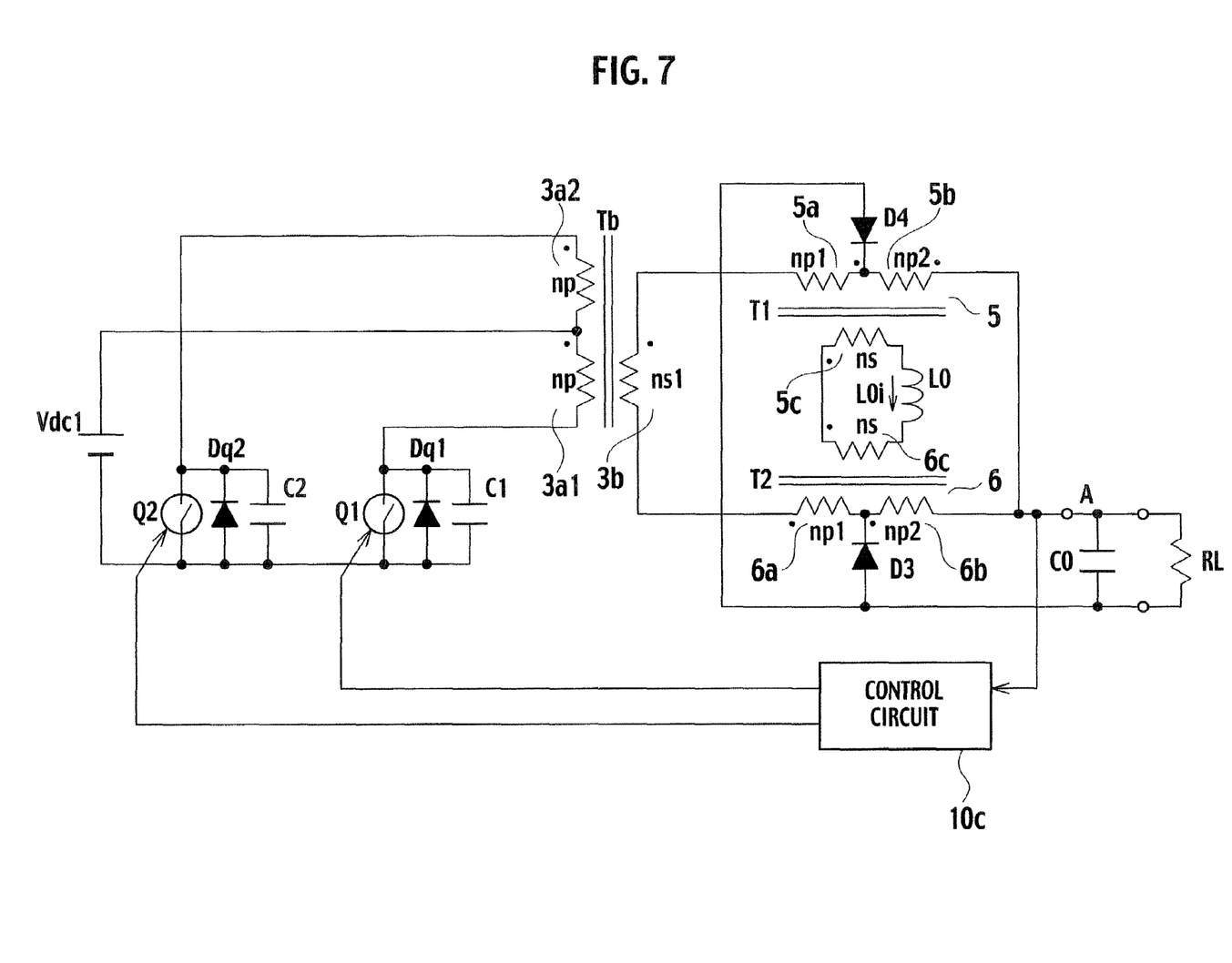
FIG. 7 is a circuit diagram of a switching power supply apparatus according to a fourth embodiment.

FIG. 7 is a circuit diagram of a switching power supply apparatus according to a fourth embodiment. While a full-bridge type conversion circuit including the switches Q1 to Q4 is used in FIG. 3, the fourth embodiment has its feature in that a push-pull conversion circuit including the switches Q1 and Q2 is used in FIG. 7.

In the conversion circuit, DC voltage of the DC power supply Vdc1 is turned ON/OFF (intermittently), the voltage is alternately supplied to primary windings 3a1 (winding number of np) and 3a2 (winding number of np) of a transformer Tb, and voltage which is symmetric in terms of positive and negative (AC voltage) is outputted from a secondary winding 3b (winding number of ns1) of the transformer Tb.

In FIG. 7, a second primary winding 3a2 (winding number of np) is serially connected to a first primary winding 3a1 (winding number of np) of the transformer Tb, a positive pole of DC power supply Vdc1 is connected to a connection between one end of the first primary winding 3a1 and one end of the second primary winding 3a2. One end (drain) of the switch Q1 including an MOSFET or the like and a cathode of a diode Dq1 and one end of a capacitor C1 are connected to the other end of the first primary winding 3a1. The other end (source) of the switch Q1, an anode of the diode Dq1, and the other end of the capacitor C1 are connected to a negative pole of the DC power supply Vdc1.

The other end of the second primary winding 3a2 is connected to one end (drain) of the switch Q2 including an MOSFET or the like, a cathode of a diode Dq2, and one end of the capacitor C2. The other end (source) of the switch Q2, an anode of the diode Dq2, and the other end of the capacitor C2 are connected to a negative terminal of the DC power supply Vdc1. The first primary winding 3a1, the second primary winding 3a2, and a secondary winding 3b (winding number of ns1) of the transformer Tb are wound in phase.

A control circuit 10c alternately ON/OFF controls the switch Q1 and the switch Q2 at a predetermined cycle, and when output voltage to a load RL becomes equal to or higher than a reference voltage, the control circuit 10c controls to narrow the ON pulse width to be applied to gates of the switches Q1 and Q2, and widen the OFF pulse width to be applied to the gates of the switches Q1 and Q2. That is, when the output voltage to the load RL becomes equal to or higher than the reference voltage, on-duty of each of the switches Q1 and Q2 is narrowed, thereby controlling the output voltage to maintain a constant voltage.

Other configurations shown in FIG. 7 are the same as those of the switching power supply apparatus of the first embodiment shown in FIG. 3, like reference symbols denote like parts, and detailed explanation thereof will be omitted.

The switching power supply apparatus of the fourth embodiment has the same secondary side circuit of the transformer Tb as that of the configuration shown in FIG. 3, and only the primary side circuit of the transformer Tb is different. Thus, an operation of only the primary side circuit will be explained with reference to the timing chart shown in FIG. 4.

At time t2, if the switch Q2 is in an OFF state and the switch Q1 is turned ON, current flows in a clockwise direction through a path extending along Vdc1, 3a1, Q1, and Vdc1, and voltage is induced in the secondary winding 3b of the transformer Tb. At time t3, if the switch Q1 is turned OFF, voltage ns1v of the secondary winding 3b of the transformer Tb becomes substantially zero.

At time t4, if the switch Q1 is in an OFF state and the switch Q2 is turned ON, current flows through a path extending along Vdc1, 3a2, Q2, and Vdc1 (upward from Vdc1 in the drawing), and voltage is induced in the secondary winding 3b of the transformer Tb. And at time t5, if the switch Q2 is turned OFF, voltage ns1v of the secondary winding 3b of the transformer Tb becomes substantially zero.

According to the switching power supply apparatus of the fourth embodiment, the same effect as that of the switching power supply apparatus according to the first embodiment can be obtained, and since the magnetic circuit is integrally provided with the transformer and the reactor, the configuration of the conversion circuit is simplified.

Integration of Magnetic Circuit

FIGS. 8A to 8E show a magnetic circuit in which the transformers and the reactor of the switching power supply apparatus of each of the first to the fourth embodiments are integrated.

Figure 8A:
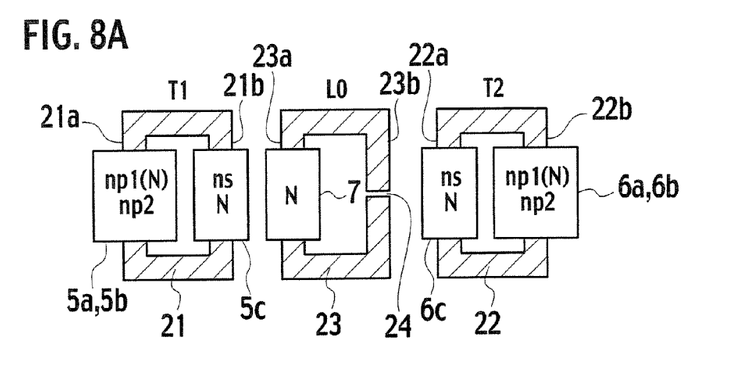
FIG. 8A shows the magnetic circuit of the embodiment of the invention.

As shown in FIG. 8A, according to the transformer T1 of the switching power supply apparatus of each of the first to the fourth embodiments, the primary winding 5 (winding number of np) is wound around a first leg 21a of a core 21 made of a magnetic material formed with a closed magnetic circuit, and a secondary winding 5c is wound around a second leg 21b of the core 21. The transformer T2 is formed such that the primary winding 6 (winding number of np) is wound around a first leg 22b of a core 22 formed with a closed magnetic circuit, and the secondary winding 6c is wound around a second leg 22a of the core 22. The reactor Lo is formed such that a winding 7 is wound around a first leg 23a of a core 23 including a gap (space). A gap 24 is formed in a second leg 23b of the core 23.

Figure 8B:
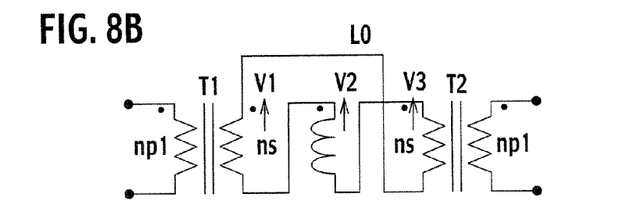
FIG. 8B shows electrical connection of the magnetic circuit.

The transformer T1, the transformer T2, and the reactor Lo are connected together as shown in FIG. 8B. With this configuration, even if the cores of the transformer T1, the transformer T2, and the reactor Lo shown in FIG. 8A are integrally formed as shown in FIG. 8C, the operation does not change.

Figure 8C:
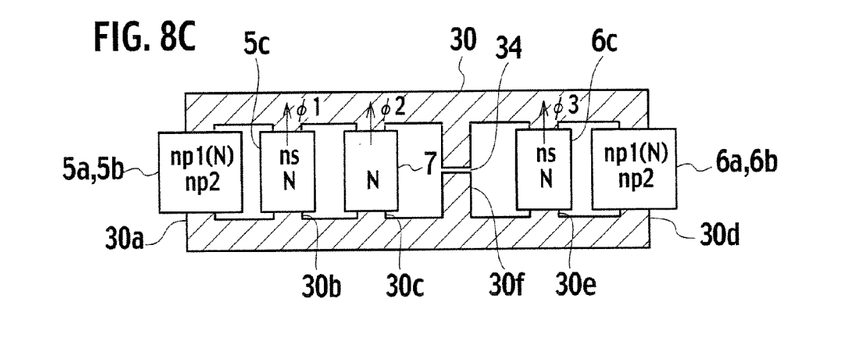
FIG. 8C shows a magnetic circuit integrally formed with a core.

According to the magnetic circuit shown in FIG. 8C, the primary winding 5 of the transformer T1 is wound around a first leg 30a of a core 30 formed with a closed magnetic circuit, the secondary winding 5c of the transformer T1 is wound around a second leg 30b, the winding 7 is wound around a third leg 30c, the primary winding 6 of the transformer T2 is wound around a fourth leg 30d, the secondary winding 6c of the transformer T2 is wound around a fifth leg 30e, and a gap 34 is formed in a sixth leg 30f. A magnetic flux penetrating the secondary winding 5c of the transformer T1 is $\Phi1$, a magnetic flux penetrating the winding 7 of the reactor Lo is $\Phi2$, and a magnetic flux penetrating the secondary winding 6c of the transformer T2 is $\Phi3$.

Since the secondary winding 5c (winding number of ns) of the transformer T1, the secondary winding 6c (winding number of ns) of the transformer T2, and the reactor Lo are connected in a form of a ring (closed loop), if voltage of the secondary winding 5c of the transformer T1 is V1, voltage of the winding 7 of the reactor Lo is V2, and voltage of the secondary winding 6c of the transformer T2 is V3, a total sum of voltage generated in the windings 5c, 6c, and 7 is obtained as V1+V2+V3=0.

If the winding numbers of the windings 5c, 6c, and 7 are equal to each other and the winding number is defined as N, a magnetic flux $\Phi$ of a core around which the winding is wound is expressed by $d\Phi/dt=V$. Therefore, since a total sum of voltages of the windings is zero, a total sum of the magnetic flux variations of the cores is also zero. Thus, even if the magnetic circuit shown in FIG. 8A is replaced by the magnetic circuit shown in FIG. 8C, since the total sum of the magnetic flux satisfies $\Phi1+\Phi2+\Phi3=0$, the operation is not influenced.

Figures 8D, 8E:
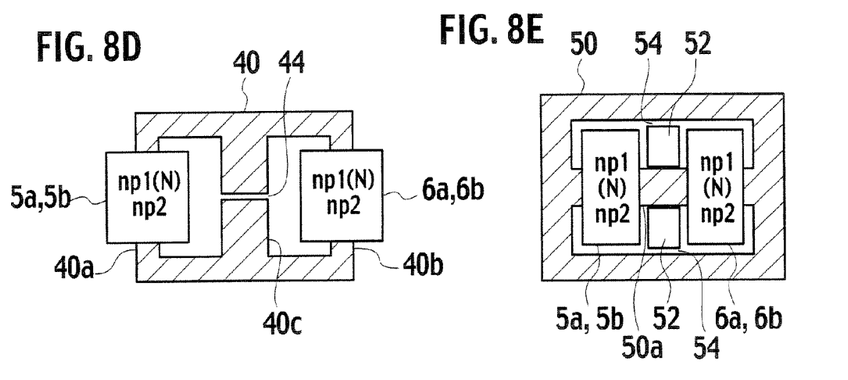
FIG. 8D shows a magnetic circuit which is equivalent to the former magnetic circuit.
FIG. 8E shows another magnetic circuit equivalent to the former magnetic circuit.

Further, since $\Delta\Phi1+\Delta\Phi2+\Delta\Phi3=0$ ($\Delta\Phi1$, $\Delta\Phi2$, and $\Delta\Phi3$ show variation in magnetic flux of $\Phi1$, $\Phi2$, and $\Phi3$), even if all of the three legs, that is, the leg 30b through which the magnetic flux $\Phi1$ passes, the leg 30c through which the magnetic flux $\Phi2$ passes and the leg 30e through which the magnetic flux $\Phi3$ passes are removed to form the magnetic circuit as shown in FIG. 8D, the operation is not influenced. According to the magnetic circuit shown in FIG. 8D, the primary winding 5 of the transformer T1 is wound around a first leg 40a of a core 40 formed with a closed magnetic circuit, the primary winding 6 of the transformer T2 is wound around a second leg 40b, and a gap 44 is formed in a third leg 40c. With this configuration, the magnetic circuit can be miniaturized.

If a core including the three legs is used in this manner, the two transformers and the reactor can be simplified, and the circuit configuration can be simplified.

As shown in FIG. 8E, a first coil including the primary winding 5 of the transformer T1 and a second coil including the primary winding 6 of the transformer T2 are wound around a central leg 50a of a core 50 formed with a closed magnetic circuit, and a magnetic shunt 52 made of a magnetic material is provided between these two coils. A gap 54 is formed between the magnetic shunt 52 and an outer leg of the core 50.

In an example of the magnetic circuit shown in FIG. 8E, the coupling state between the first and the second coils is enhanced, and most of the magnetic flux generated by both the coils passes through the magnetic shunt 52. Therefore, the inductance can be adjusted in a wide range by the gap 54 of the magnetic shunt 52. Therefore, if the gap 54 is increased in size according to a use application in which much peak current flows, the converter can be used without saturating the core.

The present invention is not limited to the switching power supply apparatus of the first to the fourth embodiments. For example, in the configuration shown in FIGS. 6 and 7, the diode D4 may be replaced by the switch Q5 shown in FIG. 5, the diode D3 may be replaced by the switch Q6 shown in FIG.

5, and the switches Q5 and Q6 may be controlled in synchronization with the switches Q1 and Q2. With this configuration, the same effect as that of the second embodiment can be obtained.

While full-bridge, half-bridge, and push-pull conversion circuits are described in the first to the fourth embodiments, any conversion circuit can be used in this invention only if output voltage becomes AC voltage which is symmetric in terms of positive and negative.

According to first and second technical aspects of the present invention, the switching power supply apparatus includes two smoothing transformers. The outputs of the transformers are synthesized by the smoothing transformers, and the outputs are added to a reactor connected to a secondary winding of the respective smoothing transformer, thereby storing energy. A primary winding of the smoothing transformer is provided with a tap, and the smoothing transformer is operated as an autotransformer. With this configuration, the secondary winding of a converter transformer serves as one winding for one output, so even when the secondary voltage of the converter transformer is higher, the secondary winding of the converter transformer can be adjusted by adjusting the tap position of the smoothing transformer. Since the secondary winding can be adjusted, if the ON period of the switching device is widened (i.e., on-duty of the switching device is optimized) with respect to the low voltage and high current, the loss of the switching device can be reduced by reducing the current peak value. Since the effective value of current flowing to the converter transformer can be reduced, the wire material of the secondary winding can be reduced and the converter transformer can be miniaturized.

According to a third technical aspect of the invention, the on-duty of the switching device can be optimized and loss can be reduced by adjusting the winding number ratio of the smoothing transformer.

According to a fourth technical aspect of the invention, the first smoothing transformer, the second smoothing transformer, and the reactor are integrally formed by using the core having three legs. Therefore, the circuit can be simplified, and the circuit can further be miniaturized and efficiency can be enhanced.

According to a fifth technical aspect of the invention, the coupling state between the first and the second coils is enhanced, most of magnetic flux generated by both the coils passes through the magnetic shunt, and the inductance can be adjusted in a wide range by the gap of the magnetic shunt. Therefore, if the gap is increased in size according to a use application in which much peak current flows, the converter can be used without saturating the core.

INDUSTRIAL APPLICABILITY

The present invention is applicable to a power supply circuit of a switching power supply apparatus such as a DC/DC converter and an AC/DC converter.

This application claims benefit of priority under 35USC §119 to Japanese Patent Applications No. 2005-244061, filed on Aug. 25, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power supply apparatus including a conversion circuit turning ON/OFF DC voltage of a DC power supply to supply the DC voltage to a primary winding of a converter transformer and outputting voltage which is symmetric in terms of positive and negative from a secondary winding of the converter transformer, comprising:
   a first smoothing transformer including
      a primary winding having a first winding and a second winding connected in series between a first end and a second end of the primary winding, and
      a secondary winding, the first end of the primary winding being connected to one end of the secondary winding of the converter transformer;
   a second smoothing transformer including
      a primary winding having a first winding and a second winding connected in series between a first end and a second end of the primary winding of the second smoothing transformer, and
      a secondary winding, the first end of the primary winding of the second smoothing transformer being connected to another end of the secondary winding of the converter transformer;
   a reactor connected to both ends of a series circuit to which the secondary winding of the first smoothing transformer and the secondary winding of the second smoothing transformer are serially connected;
   a smoothing capacitor, one end thereof being electrically connected to the second end of the primary winding of the first smoothing transformer and to the second end of the primary winding of the second smoothing transformer;
   a first diode connected to a connection of the first winding and the second winding of the first smoothing transformer and to the other end of the smoothing capacitor; and
   a second diode connected to a connection of the first winding and the second winding of the second smoothing transformer and to the other end of the smoothing capacitor.

2. A switching power supply apparatus including a conversion circuit turning ON/OFF DC voltage of a DC power supply to supply the DC voltage to a primary winding of a converter transformer and outputting voltage which is symmetric in terms of positive and negative from a secondary winding of the converter transformer, comprising:
   a first smoothing transformer including
      a primary winding having a first winding and a second winding connected in series between a first end and a second end of the primary winding, and
      a secondary winding, the first end of the primary winding being connected to one end of the secondary winding of the converter transformer;
   a second smoothing transformer including
      a primary winding having a first winding and a second winding connected in series between a first end and a second end of the primary winding of the second smoothing transformer, and
      a secondary winding, the first end of the primary winding of the second smoothing transformer being connected to another end of the secondary winding of the converter transformer;
   a reactor connected to both ends of a series circuit to which the secondary winding of the first smoothing transformer and the secondary winding of the second smoothing transformer are serially connected;

a smoothing capacitor, one end thereof being electrically connected to the second end of the primary winding of the first smoothing transformer and to the second end of the primary winding of the second smoothing transformer;

a first switching element connected to a connection of the first winding and the second winding of the first smoothing transformer and to the other end of the smoothing capacitor; and a second switching element connected to a connection of the first winding and the second winding of the second smoothing transformer and to the other end of the smoothing capacitor and turning ON/OFF complementarily with respect to the first switching element.

3. The switching power supply apparatus according to claim 1, wherein:

a winding number np1 of the first winding of the first smoothing transformer and a winding number np1 of the first winding of the second smoothing transformer are equal to each other;

a winding number np2 of the second winding of the first smoothing transformer and a winding number np2 of the second winding of the second smoothing transformer are equal to each other; and the switching power supply apparatus has a predetermined winding number ratio A expressed by A=(np1+np2)/np2.

4. The switching power supply apparatus according to claim 2, wherein:

a winding number np1 of the first winding of the first smoothing transformer and a winding number np1 of the first winding of the second smoothing transformer are equal to each other;

a winding number np2 of the second winding of the first smoothing transformer and a winding number np2 of the second winding of the second smoothing transformer are equal to each other; and the switching power supply apparatus has a predetermined winding number ratio A expressed by A=(np1+np2)/np2.

5. The switching power supply apparatus according to claim 1, wherein:

the first smoothing transformer, the second smoothing transformer, and the reactor are an integrally formed magnetic circuit;

the switching power supply apparatus includes a core formed with a closed magnetic circuit having a first leg, a second leg, and a third leg;

each of the first leg, the second leg, and the third leg is a portion of the closed magnetic circuit, the primary winding of the first smoothing transformer is wound around the first leg, the primary winding of the second smoothing transformer is wound around the second leg, and a gap is formed in the third leg.

6. The switching power supply apparatus according to claim 2, wherein:

the first smoothing transformer, the second smoothing transformer, and the reactor are an integrally formed magnetic circuit;

the switching power supply apparatus includes a core formed with a closed magnetic circuit having a first leg, a second leg, and a third leg;

each of the first leg, the second leg, and the third leg is a portion of the closed magnetic circuit, the primary winding of the first smoothing transformer is wound around the first leg, the primary winding of the second smoothing transformer is wound around the second leg, and a gap is formed in the third leg.

7. The switching power supply apparatus according to claim 1, wherein:

the first smoothing transformer, the second smoothing transformer, and the reactor are an integrally formed magnetic circuit;

the switching power supply apparatus includes a core formed with a closed magnetic circuit having a plurality of legs as portions of the closed magnetic circuit, a first coil including the primary winding of the first smoothing transformer and a second coil including the primary winding of the second smoothing transformer are wound around the first leg, and a magnetic shunt is formed between the first and the second coils.

8. The switching power supply apparatus according to claim 2, wherein:

the first smoothing transformer, the second smoothing transformer, and the reactor are an integrally formed magnetic circuit;

the switching power supply apparatus includes a core formed with a closed magnetic circuit having a plurality of legs as portions of the closed magnetic circuit, a first coil including the primary winding of the first smoothing transformer and a second coil including the primary winding of the second smoothing transformer are wound around the first leg, and a magnetic shunt is formed between the first and the second coils.

* * * * *